United States Patent
Kim et al.

(10) Patent No.: US 10,419,133 B2
(45) Date of Patent: Sep. 17, 2019

(54) METHOD OF ESTIMATING POSITION OF INTERFERENCE SIGNAL SOURCE AND APPARATUS THEREOF

(71) Applicant: Electronics and Telecommunications Research Institute, Daejeon (KR)

(72) Inventors: Chung Sup Kim, Daejeon (KR); Hyuk Je Kim, Daejeon (KR); Young Jun Chong, Daejeon (KR); Jong Soo Lim, Daejeon (KR); Woo Jin Byun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 4 days.

(21) Appl. No.: 15/825,913

(22) Filed: Nov. 29, 2017

(65) Prior Publication Data

US 2019/0089470 A1 Mar. 21, 2019

(30) Foreign Application Priority Data

Sep. 18, 2017 (KR) .................. 10-2017-0119594
Nov. 15, 2017 (KR) .................. 10-2017-0152413

(51) Int. Cl.
| | |
|---|---|
| *H04B 15/00* | (2006.01) |
| *H04W 64/00* | (2009.01) |
| *H04W 4/02* | (2018.01) |
| *H01Q 3/34* | (2006.01) |
| *H01Q 1/00* | (2006.01) |
| *H01Q 21/20* | (2006.01) |
| *H01Q 1/08* | (2006.01) |

(Continued)

(52) U.S. Cl.
CPC ............. *H04B 15/00* (2013.01); *H01Q 1/007* (2013.01); *H01Q 1/125* (2013.01); *H01Q 3/34* (2013.01); *H04W 4/029* (2018.02); *H04W 64/003* (2013.01); *H01Q 21/08* (2013.01); *H01Q 21/20* (2013.01)

(58) Field of Classification Search
CPC ........ H01Q 1/007; H01Q 1/125; H01Q 21/08; H01Q 21/20; H01Q 3/34; H04B 15/00; H04B 7/04; H04W 4/029; H04W 4/04; H04W 4/043; H04W 64/003
USPC ................... 455/456.1, 63.1, 67.11; 342/770
See application file for complete search history.

(56) References Cited

U.S. PATENT DOCUMENTS

| | | | |
|---|---|---|---|
| 4,500,883 A * | 2/1985 | Gutleber | H01Q 3/2617 342/380 |
| 9,098,088 B2 | 8/2015 | Lee et al. | |

(Continued)

FOREIGN PATENT DOCUMENTS

KR 1020160090199 A 7/2016

*Primary Examiner* — Philip Sobutka
(74) *Attorney, Agent, or Firm* — William Park & Associates Ltd.

(57) ABSTRACT

Disclosed is a method of estimating a position of a signal source and a position estimation apparatus, the method including acquiring an environment, a frequency, and a bandwidth of the interference signal source, determining an arrangement form of the two antennas based on the environment, the frequency, and the bandwidth and arranging the two antennas, and estimating a position of the interference signal source based on an interference signal of the interference signal source and the two arranged antennas, wherein the environment includes an indoor environment and an outdoor environment.

15 Claims, 19 Drawing Sheets

(51) Int. Cl.
*H01Q 1/12* (2006.01)
*H04W 4/029* (2018.01)
*H01Q 21/08* (2006.01)

(56) References Cited

U.S. PATENT DOCUMENTS 9,310,807 B2 4/2016 Lee et al.
2007/0279284 A1* 12/2007 Karayil Thekkoott Narayanan ....
H04B 7/04
342/361

* cited by examiner

110

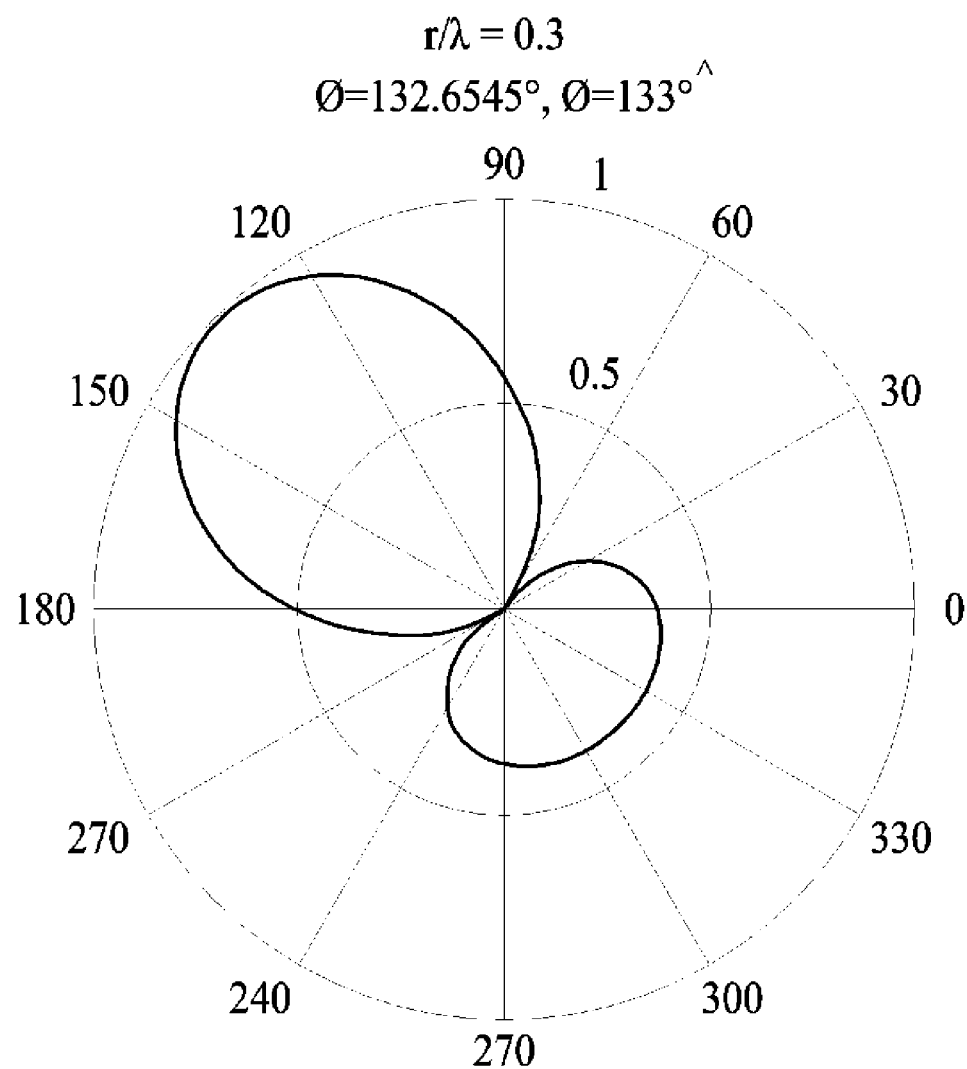

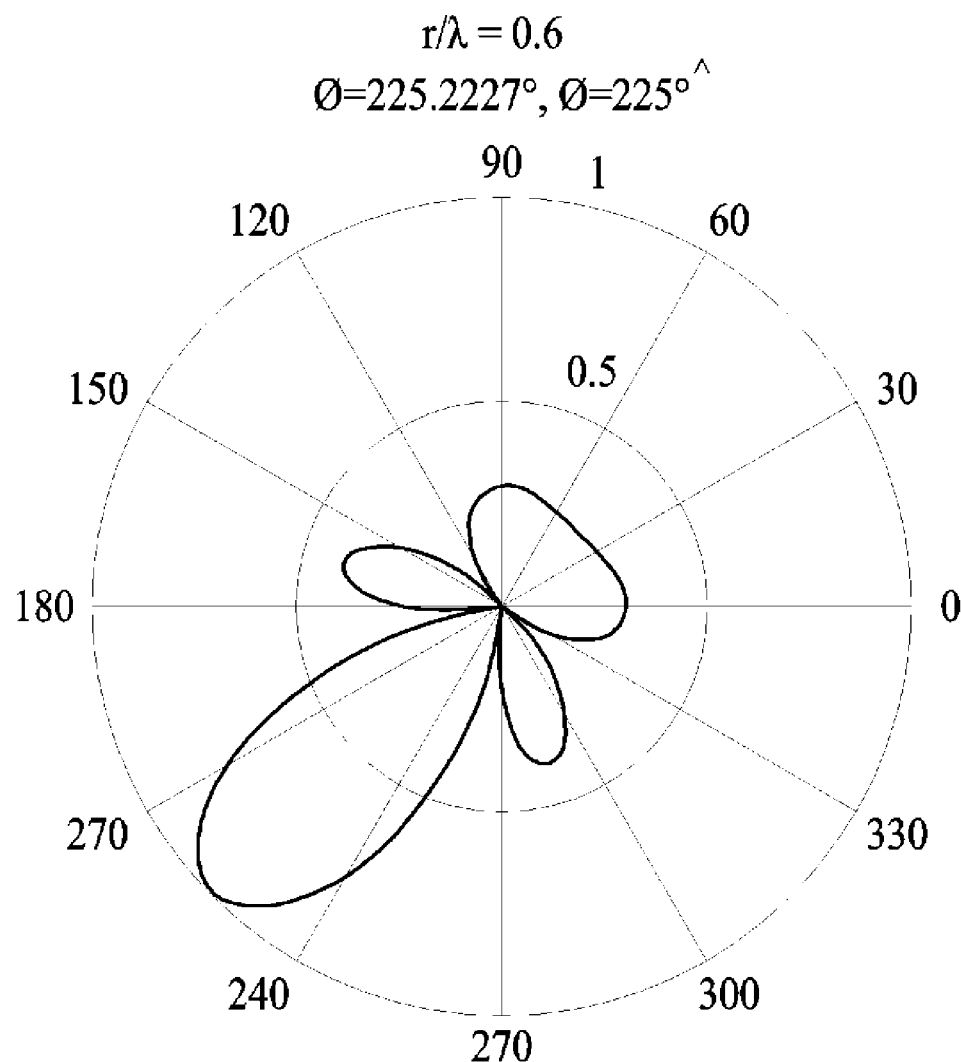

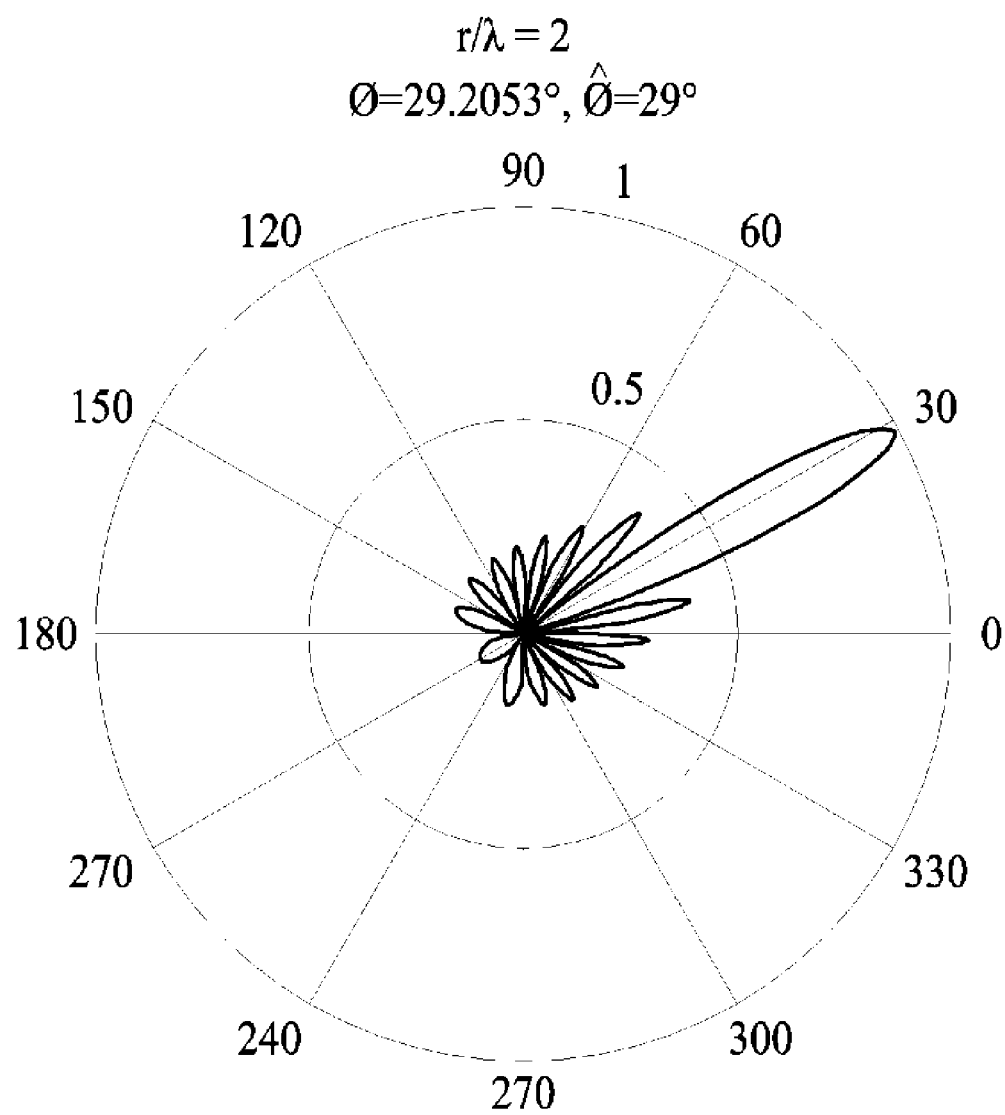

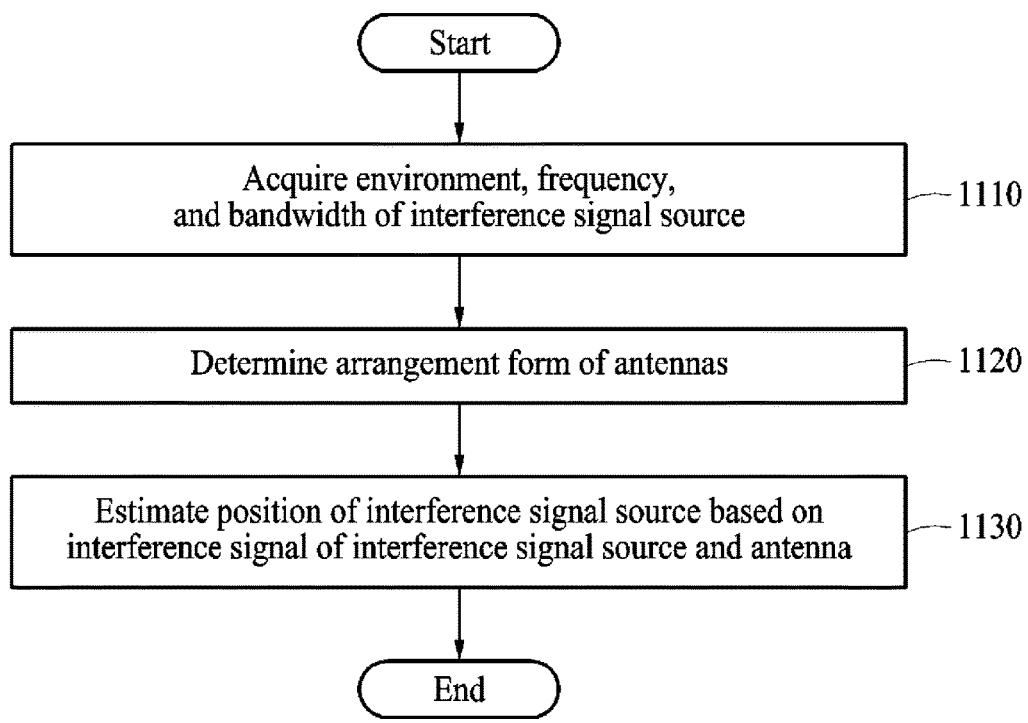

METHOD OF ESTIMATING POSITION OF INTERFERENCE SIGNAL SOURCE AND APPARATUS THEREOF

CROSS-REFERENCE TO RELATED APPLICATION(S)

This application claims the priority benefit of Korean Patent Application No. 10-2017-0119594 filed on Sep. 18, 2017, in the Korean Intellectual Property Office and Korean Patent Application No. 10-2017-0152413 filed on Nov. 15, 2017, in the Korean Intellectual Property Office, the disclosures of which are incorporated herein by reference for all purposes.

BACKGROUND

1. Field

One or more example embodiments relate to a method of estimating a position of an interference signal source and an apparatus using the method.

2. Description of Related Art

In a case in which an interference signal source uses various frequency bands, there may be used a method of estimating a position of the interference signal source based on direction information extracted from stationary antenna array-based systems installed at three areas or more. However, such method may be vulnerable to a reflected wave. Thus, it is difficult to precisely estimate a position using the method.

When estimating a position of an interference signal source at an indoor area or an outdoor area, an interruption may occur in communication performed by a wireless communication system due to interference. For example, it may be difficult to accurately estimate the position of the interference signal source in an environment in which a large number of reflected waves are generated.

To accurately estimate the position of the interference signal source irrespective of a presence of the reflected wave, expensive equipment that considers the number of antennas and channel-to-channel phase synchronization characteristics may be required. In terms of a time difference of arrival (TDOA) scheme, while a cost of a sensor may be relatively low, a performance may deteriorate rapidly in an indoor reflected-wave environment. Also, it is difficult to estimate the position of the interference signal with a narrow bandwidth.

SUMMARY

According to an aspect, there is provided a method of estimating a position of an interference signal source using two antennas, the method including acquiring an environment, a frequency, and a bandwidth of the interference signal source, determining an arrangement form of the two antennas based on the environment, the frequency, and the bandwidth and arranging the two antennas, and estimating a position of the interference signal source based on an interference signal of the interference signal source and the two arranged antennas, wherein the environment includes an indoor environment and an outdoor environment.

The determining of the arrangement form may include determining an array of the two antennas based on the environment.

The two antennas may include a first antenna and a second antenna, and the determining of the array may include arranging the first antenna to be stationary and the second antenna to be movable.

The two antennas may include a first antenna and a second antenna, and the determining of the array may include arranging the first antenna and the second antenna to be movable.

The array may include a linear array and a circular array.

The determining of the array may include arranging the two antennas in the linear array when the interference signal source is included in the indoor environment.

The two antennas may include a first antenna and a second antenna, and the arranging of the two antennas in the linear array may include arranging the first antenna to be stationary and the second antenna to be movable.

The determining of the array may include arranging the two antennas in the circular array when the interference signal source is included in the outdoor environment.

The two antennas may include a first antenna and a second antenna, and the arranging of the two antennas in the circular array may include arranging the first antenna to be stationary and the second antenna to be rotatable.

The arranging of the first antenna to be stationary and the second antenna to be rotatable may include arranging the first antenna at a center of the circular array.

The arranging of the first antenna to be stationary and the second antenna to be rotatable may include arranging the first antenna on a circumference of the circular array.

The two antennas may include a first antenna and a second antenna, and the arranging of the two antennas in the circular array may include arranging the first antenna and the second antenna to be rotatable.

The determining of the arrangement form may include determining a distance between the two antennas based on the frequency and the bandwidth.

The determining of the distance between the two antennas may include increasing the distance between the two antennas when the frequency is less than a first reference value.

The determining of the distance between the two antennas may include increasing the distance between the two antennas when the bandwidth is greater than a second reference value.

The estimating of the position of the interference signal source may include acquiring information on a plurality of channels based on the interference signal, calculating a difference in phase between the plurality of channels based on the information, and estimating the position based on the difference in phase between the plurality of channels.

The estimating of the position of the interference signal source may include acquiring beacon information and estimating the position based on the beacon information and the interference signal.

According to another aspect, there is also provided an apparatus for estimating a position of an interference signal source, the apparatus including two antennas configured to acquire an environment, a frequency, and a bandwidth of the interference signal source, and a controller configured to determine an arrangement form of the two antennas based on the environment, the frequency, and the bandwidth, arrange the two antennas, and estimate a position of the interference signal source based on an interference signal of the interference signal source and the two arranged antennas, wherein the environment includes an indoor environment and an outdoor environment.

The controller may be configured to determine an array of the two antennas based on the environment.

The controller may be configured to determine a distance between the two antennas based on the frequency and the bandwidth.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 10B is a diagram illustrating a performance of an antenna using a circular array in terms of a beam pattern.

FIG. 10C is a diagram illustrating a performance of an antenna using a circular array in terms of a beam pattern.

FIG. 10E is a diagram illustrating a performance of an antenna using a circular array in terms of a beam pattern.

FIG. 11 is a flowchart illustrating a position estimation method according to an example embodiment.

DETAILED DESCRIPTION

Figure 1:
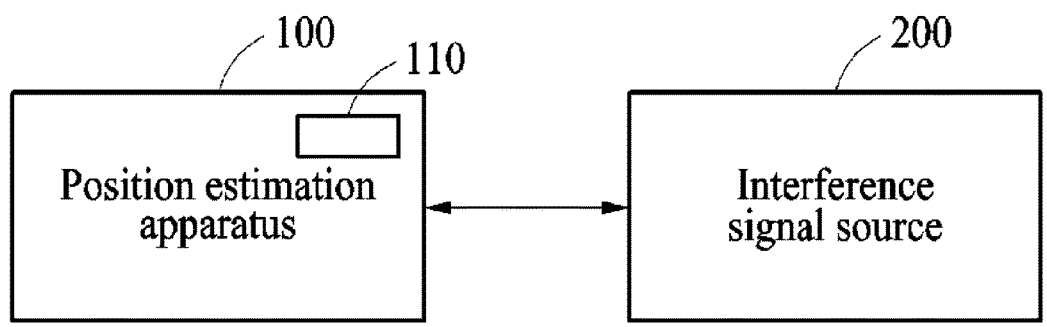
FIG. 1 is a diagram illustrating a block diagram illustrating a position estimation system according to an example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, some example embodiments will be described in detail with reference to the accompanying drawings. It should be understood, however, that there is no intent to limit this disclosure to the particular example embodiments disclosed. Like numbers refer to like elements throughout the description of the figures.

Figure 2:
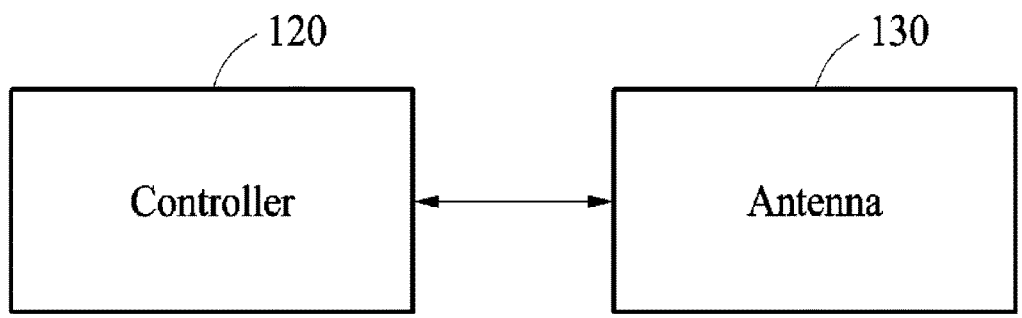
FIG. 2 is a block diagram illustrating a frequency-spatial filter of FIG. 1.

FIG. 1 is a diagram illustrating a block diagram illustrating a position estimation system according to an example embodiment and FIG. 2 is a block diagram illustrating a frequency-spatial filter of FIG. 1.

Referring to FIGS. 1 and 2, a position estimation system 10 may include a position estimation apparatus 100 and an interference signal source 200.

The position estimation apparatus 100 may estimate a position of the interference signal source 200. The position estimation apparatus 100 may estimate the position based on an interference signal between the position estimation apparatus 100 and the interference signal source 200. That is, the interference signal source 200 may transmit or receive a signal. A signal of the interference signal source 200 and a signal of the position estimation apparatus 100 may interfere with each other.

The position estimation apparatus 100 may include a frequency-spatial filter 110. The frequency-spatial filter 110 may be a frequency-spatial filter with variable bandwidth. The frequency-spatial filter 110 may support various bandwidths simultaneously with respect to a plurality of channels.

The frequency-spatial filter 110 may include a controller 120 and an antenna 130. The antenna 130 may also be implemented as a plurality of antennas 130.

The controller 120 may determine an arrangement form of the antenna 130. In this example, the controller 120 may determine the arrangement form based on an environment, a frequency, and a bandwidth of the interference signal source 200. The environment of the interference signal source 200 may include an indoor environment and an outdoor environment.

The controller 120 may determine an array of the antenna 130 based on the environment of the interference signal source 200. The array of the antenna 130 may include, for example, a linear array, a circular array, and a hybrid array. The hybrid array may be a combination of the linear array and the circular array. When the array of the antenna 130 is determined to be the hybrid array, the controller 120 may use the linear array and the circular array based on a predetermined time.

When the interference signal source 200 is included in the indoor environment, the controller 120 may arrange antennas in the linear array or the hybrid array. When the interference signal source 200 is included in the outdoor environment, the controller 120 may arrange antennas in the circular array or the hybrid array.

The antenna 130 may move on the array determined by the controller 120. When the antenna 130 is to move on the linear array, the antenna 130 may perform a linear motion backward and forward. When the antenna 130 is to move on the circular array, the antenna 130 may perform a circular motion in a clockwise direction or a counterclockwise direction.

In this example, the antenna 130 may move based on a predetermined period. The antenna 130 may repetitively move on the array at a predetermined speed.

The antenna 130 may communicate with the interference signal source 200 while moving. Because the antenna 130 communicates with the interference signal source 200 at different positions over time, an effect of using a plurality of stationary antennas may be realized. The antenna 130 communicating with the interference signal source 200 at different positions over time may also be referred to as a virtual antenna.

The controller 120 may determine a number of the antennas 130 and the positions of the antennas based on a frequency and a bandwidth of the interference signal of the interference signal source 200. The position of the antenna 130 may indicate a size of the array on which the antenna 130 moves. The size of the array on which the antenna 130 moves may be associated with a wavelength of the interference signal. The wavelength of the interference signal may be inversely proportional to a frequency of the interference signal.

In terms of the linear array, the controller 120 may determine a length of the linear array. In terms of the circular array, the controller 120 may determine a length of the circular array. The length of the circular array may be dependent on a radius. Here, the radius may be understood as an aperture. When a frequency is relatively low, the controller 120 may increase a size of the array. When a frequency of the interference signal is less than a first reference value, the controller 120 may increase a size of the array. The controller 120 may increase the length of the linear array or increase the aperture of the circular array, thereby achieving increased accuracy of position estimation. When the size of the array is increased, a sharpness of a beam pattern of the antenna 130 may increase and thus, the accuracy may also be increased.

Also, the number of the antennas 130 may indicate a moving speed of the antenna 130. The controller 120 may control the speed of the antenna 130 proportionally to the size of the array. When the array is relatively large, the controller 120 may increase the speed of the antenna 130. When the array is relatively small, the antenna 130 may reduce the speed. By controlling the speed of the antenna 130, the controller 120 may obtain an effect of controlling the number of antennas. When the array of the antenna 130 is large and the speed of the antenna 130 is high, a beam width may be minimized and thus, the accuracy of position estimation of the controller 120 may also increase.

The bandwidth may be an amount of information on a modulated signal included in the interference signal. Thus, when the bandwidth increases, the amount of information may also increase and a change may be accelerated. When the bandwidth is large, the controller 120 may increase the number of antennas. For example, when the bandwidth is greater than a second reference value, the controller 120 may increase the speed of the antennas. By increasing the number of antennas, the controller 120 may accurately perform the position estimation. When the antenna 130 includes two antennas, the number of antennas may increase without restrictions on time and speed. When the frequency and the bandwidth of the interference signal source 200 are changed, the controller 120 may adaptively change the arrangement form of the antenna 130.

The controller 120 may correct the number of the antennas 130 and the position of the antenna 130 based on a frequency, a presence time, and a periodicity of the interference signal of the interference signal source 200.

The controller 120 may estimate a position of the interference signal source 200 based on the interference signal of the interference signal source 200 and the antenna 130. In this example, the controller 120 may use a Doppler effect. For example, the controller 120 may use a characteristic that a frequency of the interference signal received from the interference signal source 200 while the antenna 130 is moving varies, to estimate the position of the interference signal source 200.

The controller 120 acquires information on a plurality of channels based on the interference signal. The information may include, for example, a phase and a signal of each of the channels. The controller 120 may calculate a difference in phase between the plurality of channels based on the information on the plurality of channels and estimate the position of the interference signal source 200 based on the difference in phase.

The controller 120 may additionally acquires beacon information from a beacon. The beacon may provide positional information in the indoor environment in general. The beacon information may include the positional information. The controller 120 may precisely estimate the position of the interference signal source 200 based on the beacon information and the interference signal.

Figure 3:
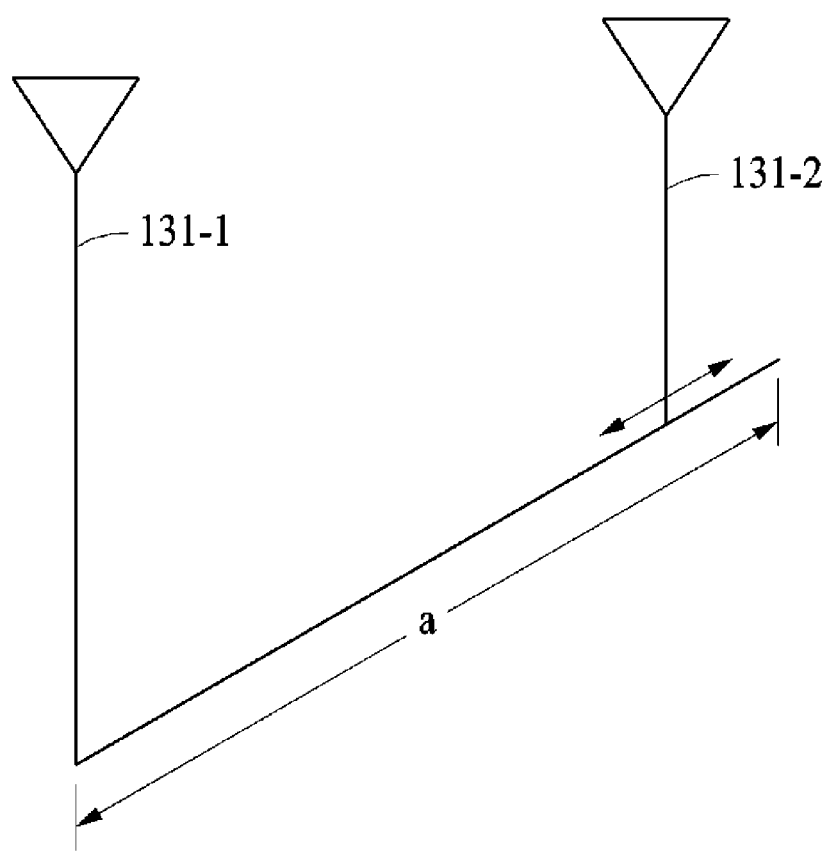
FIG. 3 is a diagram illustrating an example of a linear array of antennas.

FIG. 3 is a diagram illustrating an example of a linear array of antennas.

Referring to FIG. 3, the antenna 130 may be implemented as a first antenna 131-1 and a second antenna 131-2.

When the interference signal source 200 is present in an indoor environment, for example, a department store, a museum, a gym, a classroom, and a stadium, the controller 120 may determine the first antenna 131-1 and the second antenna 131-2 to be arranged in a linear array. The controller 120 may arrange the first antenna 131-1 and the second antenna 131-2 in a corner area of the indoor environment. When the first antenna 131-1 and the second antenna 131-2 are arranged in the linear array, a degree to which the first antenna 131-1 and the second antenna 131-2 affect each other may be reduced. For example, interference between the first antenna 131-1 and the second antenna 131-2 may be minimized.

The controller 120 may arrange the first antenna 131-1 to be stationary and the second antenna 131-2 to be movable. The first antenna 131-1 may be a stationary antenna and the second antenna 131-2 may be a moving antenna. The first antenna 131-1 may be greater in size than the second antenna 131-2. The first antenna 131-1 may communicate with the interference signal source 200 in a stationary state. The second antenna 131-2 may communicate with the interference signal source 200 while moving on the linear array.

The controller 120 may determine a length a of the linear array on which the second antenna 131-2 moves. In this example, the controller 120 may determine the length a based on a frequency and a bandwidth of the interference signal source 200. When the frequency of the interference signal source 200 is greater than a first reference value, the controller 120 may increase the length a of the linear array. When the bandwidth of the interference signal source 200 is greater than a second reference value, the controller 120 may also increase the length a of the linear array.

The second antenna 131-2 may move on the linear array based on a predetermined period. The second antenna 131-2 may move back and forth on the linear array at a predetermined speed.

The first antenna 131-1 and the second antenna 131-2 may each communicate with the interference signal source 200 and transmit the interference signal to the controller 120.

The controller 120 may estimate a position of the interference signal source 200 based on the interference signal.

Figure 4A:
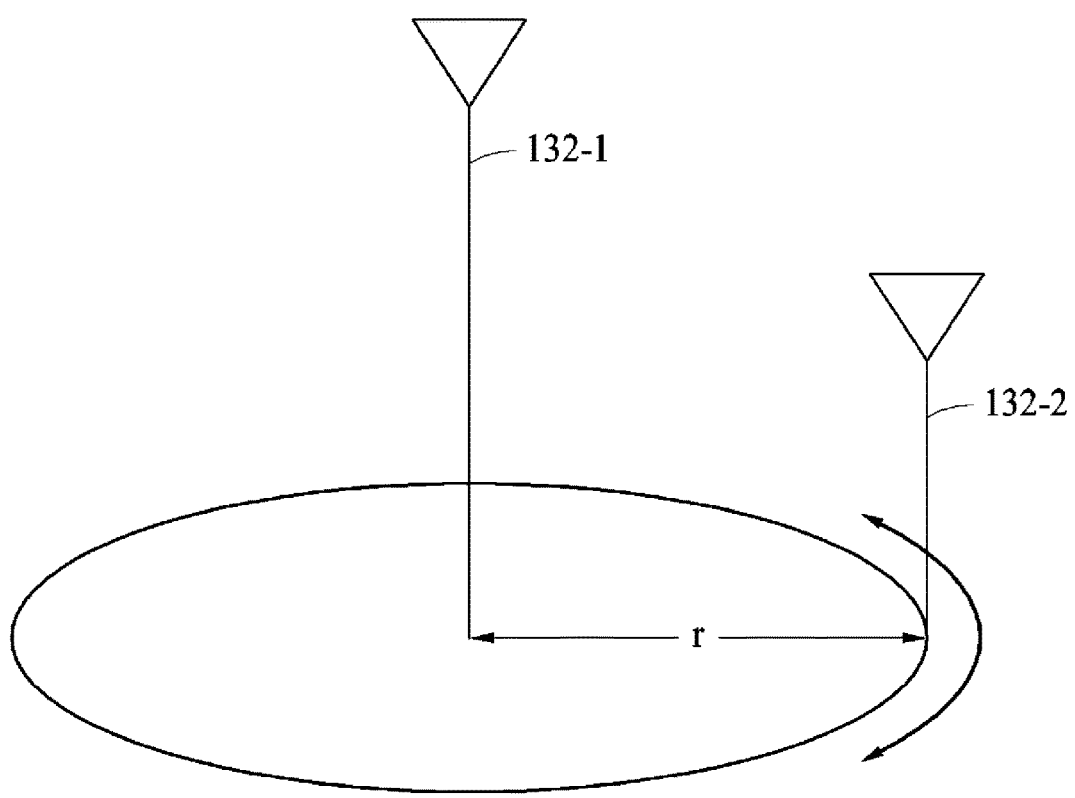
FIG. 4A is a diagram illustrating an example of a circular array of antennas.
Figure 4B:
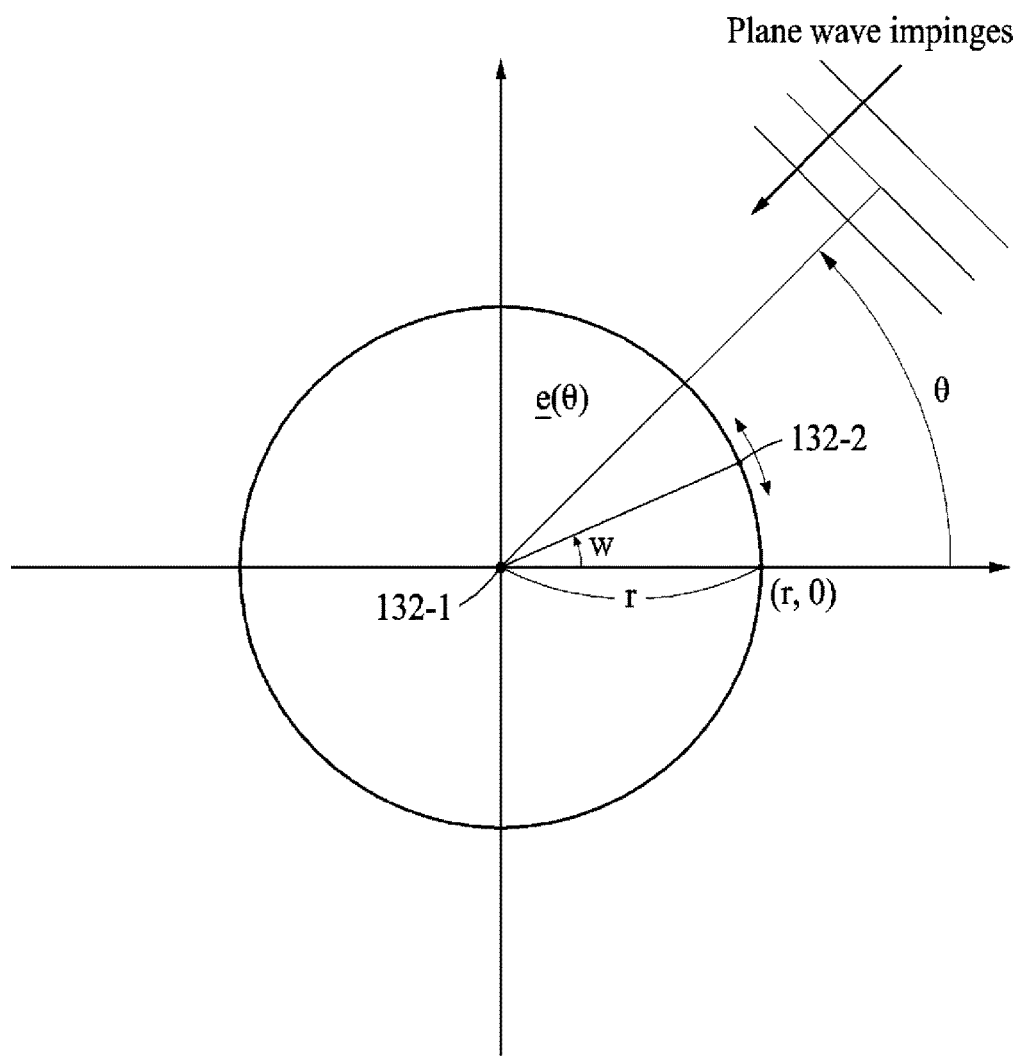
FIG. 4B is a diagram illustrating the antennas of FIG. 4A.

FIG. 4A is a diagram illustrating an example of a circular array of antennas and FIG. 4B is a diagram illustrating the antennas of FIG. 4A.

Referring to FIGS. 4A and 4B, the antenna 130 may be implemented as a first antenna 132-1 and a second antenna 132-2.

When the interference signal source 200 is present in an outdoor environment, for example, a playground, a park, a market, and a road, the controller 120 may determine the first antenna 132-1 and the second antenna 132-2 to be arranged in a circular array. When the first antenna 132-1 and the second antenna 132-2 are arranged in the circular array, position estimation may be easily performed in an environment in which a position of the interference signal source 200 is difficult to be acquired.

The controller 120 may fix the first antenna 132-1 at a center of the circular array and dispose the second antenna 132-2 to be movable on the circular array. The first antenna 132-1 may be a stationary antenna and the second antenna 132-2 may be a moving antenna. The first antenna 132-1 may be greater in size than the second antenna 132-2. The first antenna 132-1 may communicate with the interference signal source 200 in a stationary state. The second antenna 132-2 may communicate with the interference signal source 200 while moving on the circular array.

The controller 120 may determine a length, for example, $2\pi r$ of the circular array on which the second antenna 132-2 moves. The controller 120 may determine a distance between the first antenna 132-1 and the second antenna 132-2, a radius r of the circular array. In this example, the controller 120 may apply a frequency and a bandwidth of the interference signal source 200. When the frequency of the interference signal source 200 is greater than a first reference value, the controller 120 may increase the radius r. When the bandwidth of the interference signal source 200 is greater than a second reference value, the controller 120 may also increase the radius r.

The second antenna 132-2 may move on the circular array based on a predetermined period. The second antenna 132-2 may move in a clockwise or counterclockwise direction on the circular array at a predetermined speed.

The first antenna 132-1 and the second antenna 132-2 may each communicate with the interference signal source 200 and transmit the interference signal to the controller 120. The controller 120 may estimate a position of the interference signal source 200 based on the interference signal.

A signal received by the second antenna 132-2 from the interference signal source 200 may be expressed using Equation 1 below.

$$y_2(t) = m(t)\exp\left(j2\pi\left(\frac{r}{\lambda_c}\cos(\theta-\omega t)\right)\right) + n_I(t) \quad [\text{Equation 1}]$$

In Equation 1, $y_2(t)$ denotes an interference signal received by the second antenna 132-2 from the interference signal source 200 in a time t, $m(t)$ denotes a message signal included in the interference signal, r denotes a size of an aperture of a circular array, $\lambda_c$ denotes a wavelength of the interference signal, $\theta$ denotes information on an angle of arrival to be estimated, $\omega$ denotes an angular velocity of the second antenna 132-2, and $n_I(t)$ denotes a noise component included in the interference signal. Here, the angle of arrival may be an angle between the interference signal source 200 and a reference point with respect to the first antenna 132-1.

The controller 120 may use a signal received by the first antenna 132-1 from the interference signal source 200 to estimate the position of the interference signal source 200 by removing an influence of the message signal. For example, the controller 120 may divide an interference signal received by the first antenna 132-1 from the interference signal source 200 in the time t using Equation 1 so as to obtain a Doppler frequency as shown in Equation 2 below.

$$F = \frac{y_1(t)}{y_2(t)} = \exp\left(j2\pi\left(\frac{r}{\lambda_c}\cos(\theta-\omega t)\right)\right) + n_I(t) \quad [\text{Equation 2}]$$

In Equation 2, F denotes a Doppler frequency, $y_1(t)$ denotes an interference signal received by the first antenna 132-1 from the interference signal source 200 in the time t, $y_2(t)$ denotes an interference signal received by the second antenna 132-2 from the interference signal source 200 in the time t, r denotes a size of an aperture of a circular array, $\lambda_c$ denotes a wavelength of the interference signal, $\theta$ denotes information on an angle of arrival to be estimated, $\omega$ denotes an angular velocity of the second antenna 132-2, $n_I(t)$ denotes a noise component included in the interference signal. Here, the angle of arrival may be an angle between the interference signal source 200 and a reference point with respect to the first antenna 132-1.

The controller 120 may estimate a position of the interference signal source 200 using a frequency modulation (FM) signal from which the message signal is removed as expressed by Equation 2.

Figure 5A:
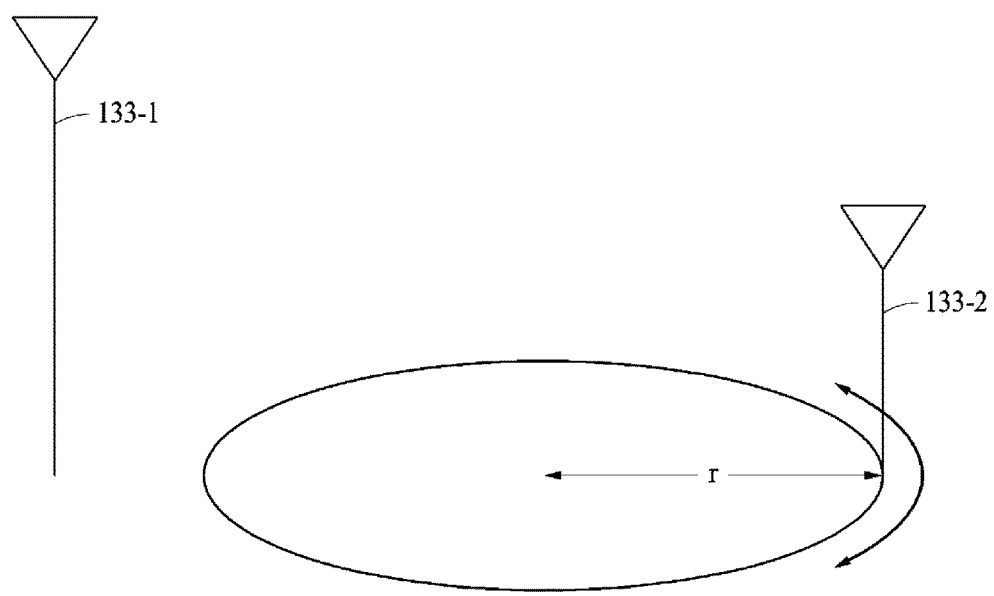
FIG. 5A is a diagram illustrating an example of a circular array of antennas.
Figure 5B:
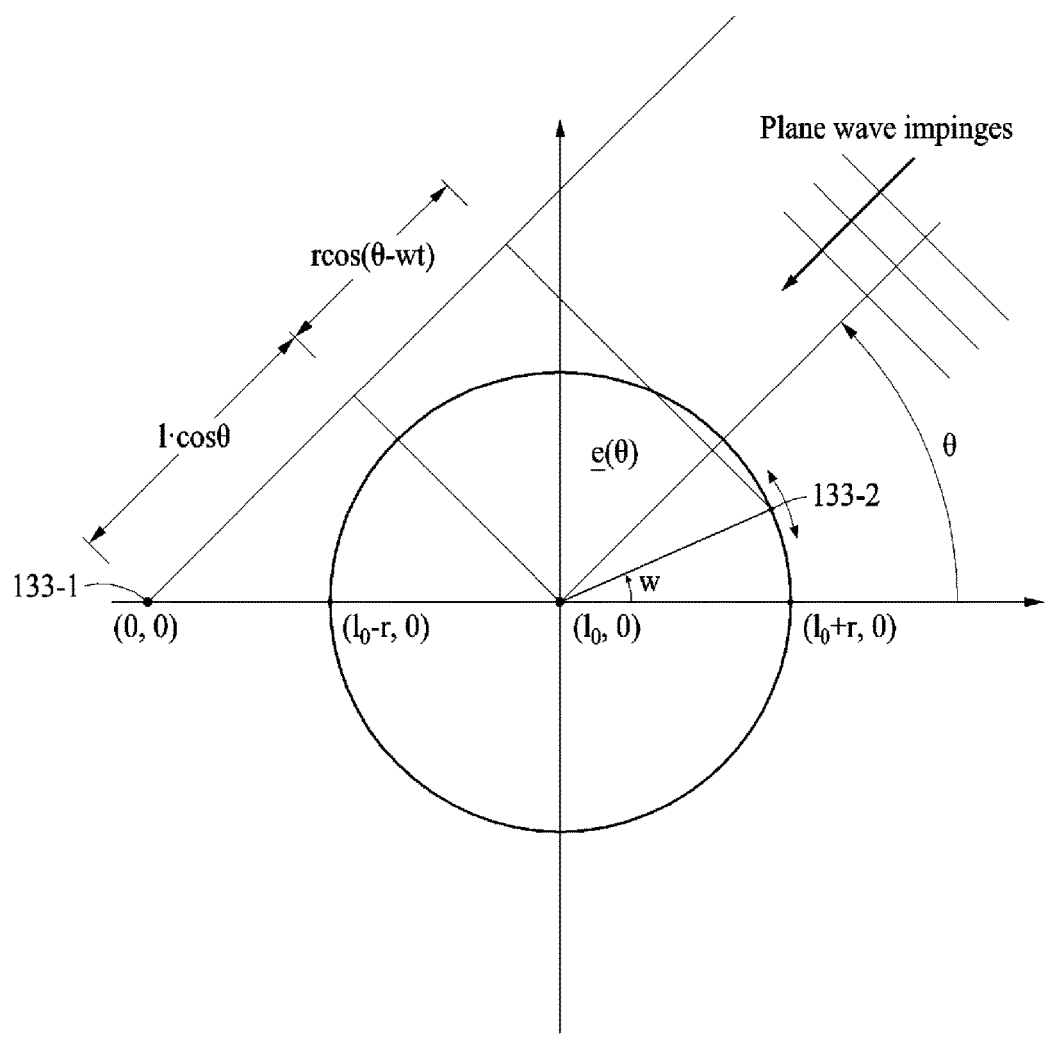
FIG. 5B is a diagram illustrating the antennas of FIG. 5A.

FIG. 5A is a diagram illustrating an example of a circular array of antennas and FIG. 5B is a diagram illustrating the antennas of FIG. 5A.

Referring to FIGS. 5A and 5B, the antenna 130 may be implemented as a first antenna 133-1 and a second antenna 133-2.

When the interference signal source 200 is present in an outdoor environment, for example, a playground, a park, a market, and a road, the controller 120 may determine the first antenna 133-1 and the second antenna 133-2 to be arranged in a circular array. When the first antenna 133-1 and the second antenna 133-2 are arranged in the circular array, position estimation may be easily performed in an environment in which a position of the interference signal source 200 is difficult to be acquired.

The controller 120 may dispose the first antenna 133-1 outside the circular array and dispose the second antenna 133-2 to be movable on the circular array. The first antenna 133-1 may be a stationary antenna and the second antenna 133-2 may be a moving antenna. The first antenna 133-1 may be greater in size than the second antenna 133-2. The first antenna 133-1 may communicate with the interference signal source 200 in a stationary state. The second antenna 133-2 may communicate with the interference signal source 200 while moving on the circular array.

The controller 120 may dispose the first antenna 133-1 to separate from the center of the circular array by a distance $l_0$. The controller 120 may determine a length, for example, $2\pi r$ of the circular array on which the second antenna 133-2 moves. The controller 120 may determine a radius r of the circular array. In this example, the controller 120 may apply a frequency and a bandwidth of the interference signal source 200. When the frequency of the interference signal source 200 is greater than a first reference value, the controller 120 may increase the radius r. When the bandwidth of the interference signal source 200 is greater than a second reference value, the controller 120 may also increase the radius r.

The second antenna 133-2 may move on the circular array based on a predetermined period. The second antenna 133-2 may move in a clockwise or counterclockwise direction on the circular array at a predetermined speed.

The first antenna 133-1 and the second antenna 133-2 may each communicate with the interference signal source 200 and transmit the interference signal to the controller 120. The controller 120 may estimate a position of the interference signal source 200 based on the interference signal.

The controller 120 may divide interference signals received by the first antenna 133-1 and the second antenna 133-2 from the interference signal source 200 in a time t by each other to obtain a Doppler frequency as shown in Equation 3 below.

$$F = \frac{y_1(t)}{y_2(t)} = \exp\left(j2\pi\left(\frac{r}{\lambda_c}\cos(\theta - \omega t)\right) + j2\pi\left(\frac{l_0}{\lambda_c}\cos\theta\right)\right) + n_I(t) \quad \text{[Equation 3]}$$

In Equation 3, F denotes a Doppler frequency, $y_1(t)$ denotes an interference signal received by the first antenna 133-1 from the interference signal source 200 in the time t, $y_2(t)$ denotes an interference signal received by the second antenna 133-2 from the interference signal source 200 in the time t, r denotes a size of an aperture of a circular array, $\lambda_c$ denotes a wavelength of the interference signal, θ denotes information on an angle of arrival to be estimated, ω denotes an angular velocity of the second antenna 133-2, $l_0$ denotes a distance between the first antenna 133-1 and the center of the circular array, and $n_I(t)$ denotes a noise component included in the interference signal. Here, the angle of arrival may be an angle between the interference signal source 200 and a reference point with respect to the first antenna 133-1.

The controller 120 may estimate a position of the interference signal source 200 using an FM signal from which the message signal is removed as expressed by Equation 3.

Figure 6:
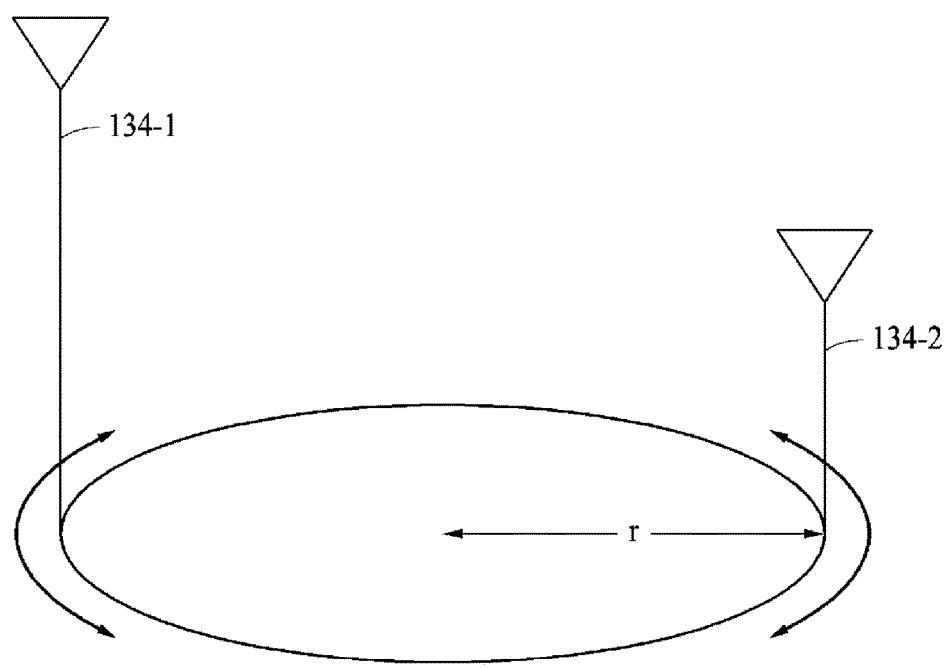
FIG. 6 is a diagram illustrating an example of a circular array of antennas.

FIG. 6 is a diagram illustrating an example of a circular array of antennas.

Referring to FIG. 6, the antenna 130 may be implemented as a first antenna 134-1 and a second antenna 134-2.

When the interference signal source 200 is present in an outdoor environment, for example, a playground, a park, a market, and a road, the controller 120 may determine the first antenna 134-1 and the second antenna 134-2 to be arranged in a circular array. When the first antenna 134-1 and the second antenna 134-2 are arranged in the circular array, position estimation may be easily performed in an environment in which a position of the interference signal source 200 is difficult to be acquired.

The controller 120 may arrange the first antenna 134-1 and the second antenna 134-2 to be movable on the circular array. The first antenna 134-1 and the second antenna 134-2 may be moving antennas. The first antenna 134-1 and the second antenna 134-2 may communicate with the interference signal source 200 while moving on the circular array. In comparison to the first antenna 132-1 and the second antenna 132-2 of FIG. 4A, both the first antenna 134-1 and the second antenna 134-2 of FIG. 6 may move on the circular array and thus, a size of an aperture may decrease by half. Thus, the first antenna 134-1 and the second antenna 134-2 of FIG. 6 may be effectively used when a system is to be minimized in size due to a small area.

The controller 120 may determine a length, for example, $2\pi r$ of the circular array on which the first antenna 134-1 and the second antenna 134-2 move. The controller 120 may determine a radius r of the circular array. In this example, the controller 120 may apply a frequency and a bandwidth of the interference signal source 200. When the frequency of the interference signal source 200 is greater than a first reference value, the controller 120 may increase the radius r. When the bandwidth of the interference signal source 200 is greater than a second reference value, the controller 120 may also increase the radius r.

The first antenna 134-1 and the second antenna 134-2 may move on the circular array based on a predetermined period. The first antenna 134-1 and the second antenna 134-2 may move in a clockwise or counterclockwise direction on the circular array at a predetermined speed. The first antenna 134-1 and the second antenna 134-2 may move in the same direction.

The first antenna 134-1 and the second antenna 134-2 may each communicate with the interference signal source 200 and transmit the interference signal to the controller 120. The controller 120 may estimate a position of the interference signal source 200 based on the interference signal.

Although FIGS. 3 through 6 illustrate the method of estimating a position of an interference signal source using two antennas for brevity of description, the number of antennas is not limited thereto. For example, at least three antennas may be used to estimate a position of an interference signal source based on the method of the present disclosure.

Also, the foregoing explanation is based on the indoor environment using the linear array and the outdoor environment using the circular array. However, embodiments are not limited thereto. It is obvious that the circular array is applicable to the indoor environment and the linear array is applicable to the outdoor environment.

Figure 7:
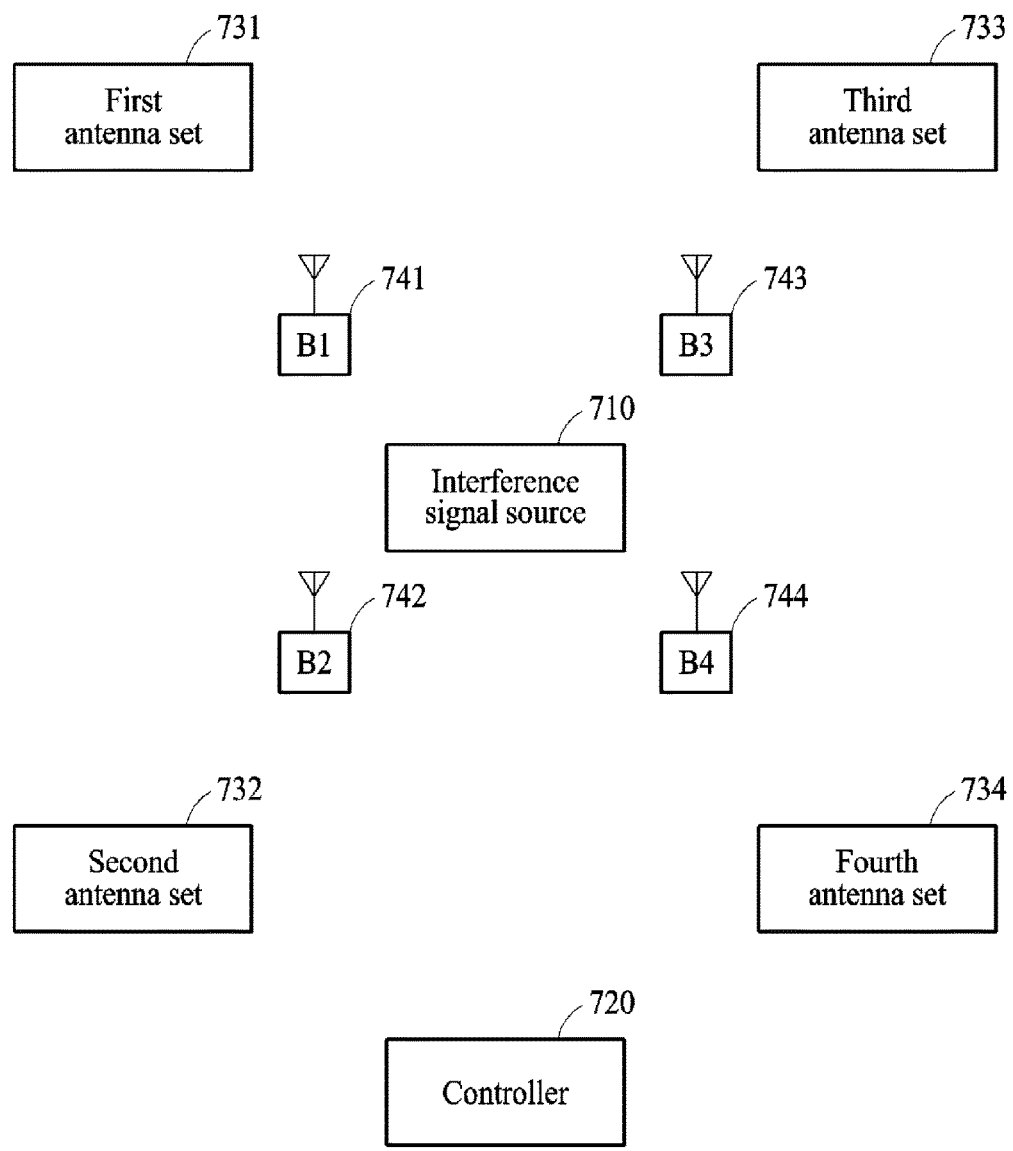
FIG. 7 is a diagram illustrating an operation of a position estimation apparatus estimating a position of an interference signal source in an indoor environment.

FIG. 7 is a diagram illustrating an operation of a position estimation apparatus estimating a position of an interference signal source in an indoor environment.

Referring to FIG. 7, a position estimation apparatus may estimate a position of an interference signal source 710 located in an indoor environment. The position estimation apparatus may include a controller 720, a first antenna set 731, a second antenna set 732, a third antenna set 733, and a fourth antenna set 734. The first antenna set 731, the second antenna set 732, the third antenna set 733, and the fourth antenna set 734 may each include two antennas, for example, a first antenna and a second antenna.

The controller 720 may arrange the first antenna set 731, the second antenna set 732, the third antenna set 733, and the fourth antenna set 734 in a corner area of the indoor environment. Through this, interferences between the antenna sets may be minimized. The following explanation will be provided based on the first antenna set 731 and also applicable to the second antenna set 732, the third antenna set 733, and the fourth antenna set 734.

The controller 720 may acquire an environment, a frequency, and a bandwidth of the interference signal source 710.

The controller 720 may determine an array of the first antenna set 731 based on the environment of the interference signal source 710.

The controller 720 may verify that the interference signal source 710 is in the indoor environment and determine an array of the first antenna set 731 to be a linear array. In the linear array, the controller 720 may arrange the first antenna of the first antenna set 731 to be stationary and the second antenna of the first antenna set 731 to be movable. The description of FIG. 3 is also applicable to the linear array and thus, descriptions of such are omitted for brevity.

When an area of the indoor environment is greater than a third reference value, the controller 720 may determine the array of the first antenna set 731 to be a circular array or a hybrid array.

The controller 720 may determine a distance between the first antenna and the second antenna included in the first antenna set 731 based on the frequency and the bandwidth of the interference signal source 710. When the frequency of the interference signal source 710 is greater than a first reference value, the controller 720 may increase the distance. When the bandwidth of the interference signal source 710 is greater than a second reference value, the controller 720 may increase the distance.

The first antenna set 731 may transmit an interference signal received from the interference signal source 710 to the controller 720. Similarly, the second antenna set 732, the third antenna set 733, and the fourth antenna set 734 may transmit interference signals received from the interference signal source 710 to the controller 720.

The controller 720 may estimate a position of the interference signal source 710 based on the interference signal received from each of the antenna sets.

The controller 720 may additionally use beacon information. A first beacon 741, a second beacon 742, a third beacon 743, and a fourth beacon 744 may be included in the indoor environment. The first beacon 741, the second beacon 742, the third beacon 743, and the fourth beacon 744 may transmit beacon information associated with the position of the interference signal source 710 to the controller 720.

Although FIG. 7 illustrates four antenna sets for brevity of description, the number of antenna sets is not limited thereto. It is obvious that one or more antenna sets are implementable.

Figure 8:
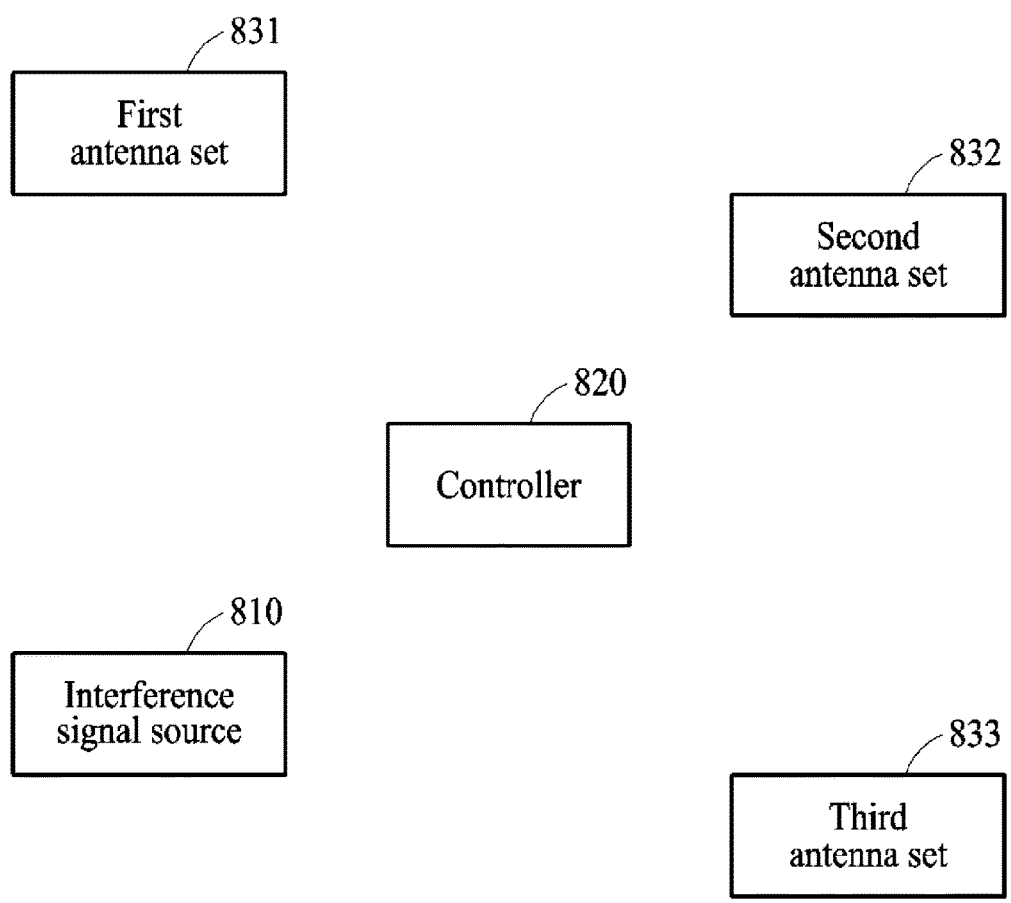
FIG. 8 is a diagram illustrating an operation of a position estimation apparatus estimating a position of an interference signal source in an outdoor environment.

FIG. 8 is a diagram illustrating an operation of a position estimation apparatus estimating a position of an interference signal source in an outdoor environment.

Referring to FIG. 8, a position estimation apparatus may estimate a position of an interference signal source 810 located in an outdoor environment. The position estimation apparatus may include a controller 820, a first antenna set 831, a second antenna set 832, and a third antenna set 833. The first antenna set 831, the second antenna set 832, and the third antenna set 833 may each include two antennas, for example, a first antenna and a second antenna. The following explanation will be provided based on the first antenna set 831 and also applicable to the second antenna set 832, and the third antenna set 833.

The controller 820 may acquire an environment, a frequency, and a bandwidth of the interference signal source 810.

The controller 820 may determine an array of the first antenna set 831 based on the environment of the interference signal source 810.

The controller 820 may verify that the interference signal source 810 is in the outdoor environment and determine an array of the first antenna set 831 to be a circular array.

In the circular array, the controller 820 may arrange the first antenna of the first antenna set 831 to be stationary and the second antenna of the first antenna set 831 to be movable. In this example, the first antenna may be located at a center of the circular array or located outside the circular array. The description of FIGS. 4A and 4B is also applicable to the first antenna located at the center of the circular array. The description of FIGS. 5A and 5B is also applicable to the first antenna located outside the circular array. The second antenna may move on the circular array.

Also, in the circular array, the controller 820 may arrange the first antenna and the second antenna included in the first antenna set 831 to be movable. In this example, the first antenna and the second antenna may move on the circular array. The description of FIG. 6 is also applicable to the first antenna and the second antenna moving on the circular array.

When an area of the outdoor environment is less than a fourth reference value, the controller 820 may determine the array of the first antenna set 831 to be a linear array or a hybrid array.

The controller 820 may determine a size of the circular array included in the first antenna set 831 based on a frequency and a bandwidth of the interference signal source 810. The controller 820 may determine a size of an aperture based on the frequency and the bandwidth of the interference signal source 810. When the frequency of the interference signal source 810 is greater than a first reference value, the controller 820 may increase the size of the aperture. When the bandwidth of the interference signal source 810 is greater than a second reference value, the controller 820 may increase the size of the aperture.

The first antenna set 831 may transmit an interference signal received from the interference signal source 810 to the controller 820. Similarly, the second antenna set 832 and the third antenna set 833 may transmit interference signals received from the interference signal source 810 to the controller 820.

The controller 820 may estimate a position of the interference signal source 810 based on the interference signal received from each of the antenna sets.

Although FIG. 8 illustrates three antenna sets for brevity of description, the number of antenna sets is not limited thereto. It is obvious that one or more antenna sets are implementable.

Figure 9A:
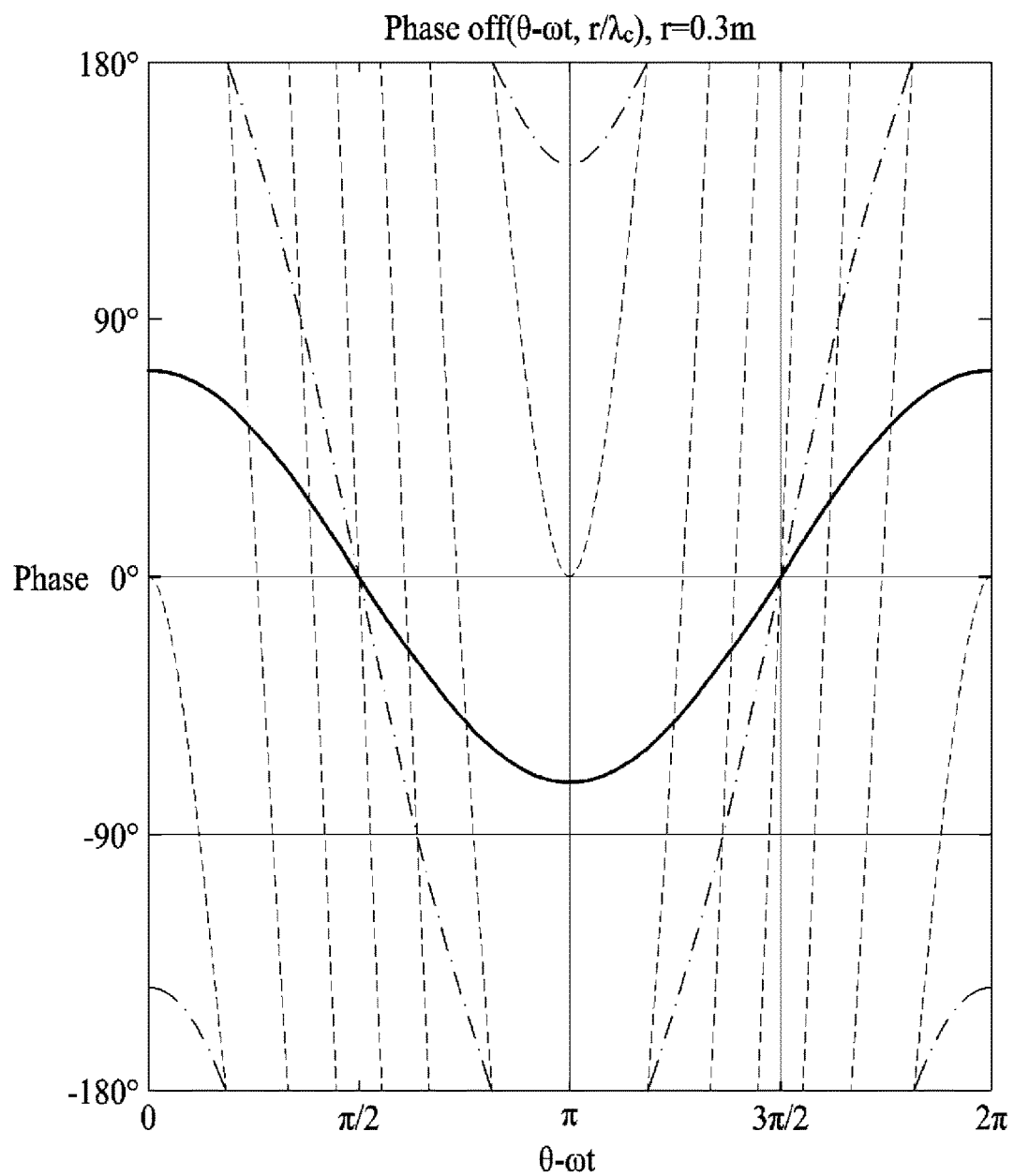
FIG. 9A is a diagram illustrating a performance of an antenna in a circular array.
Figure 9B:
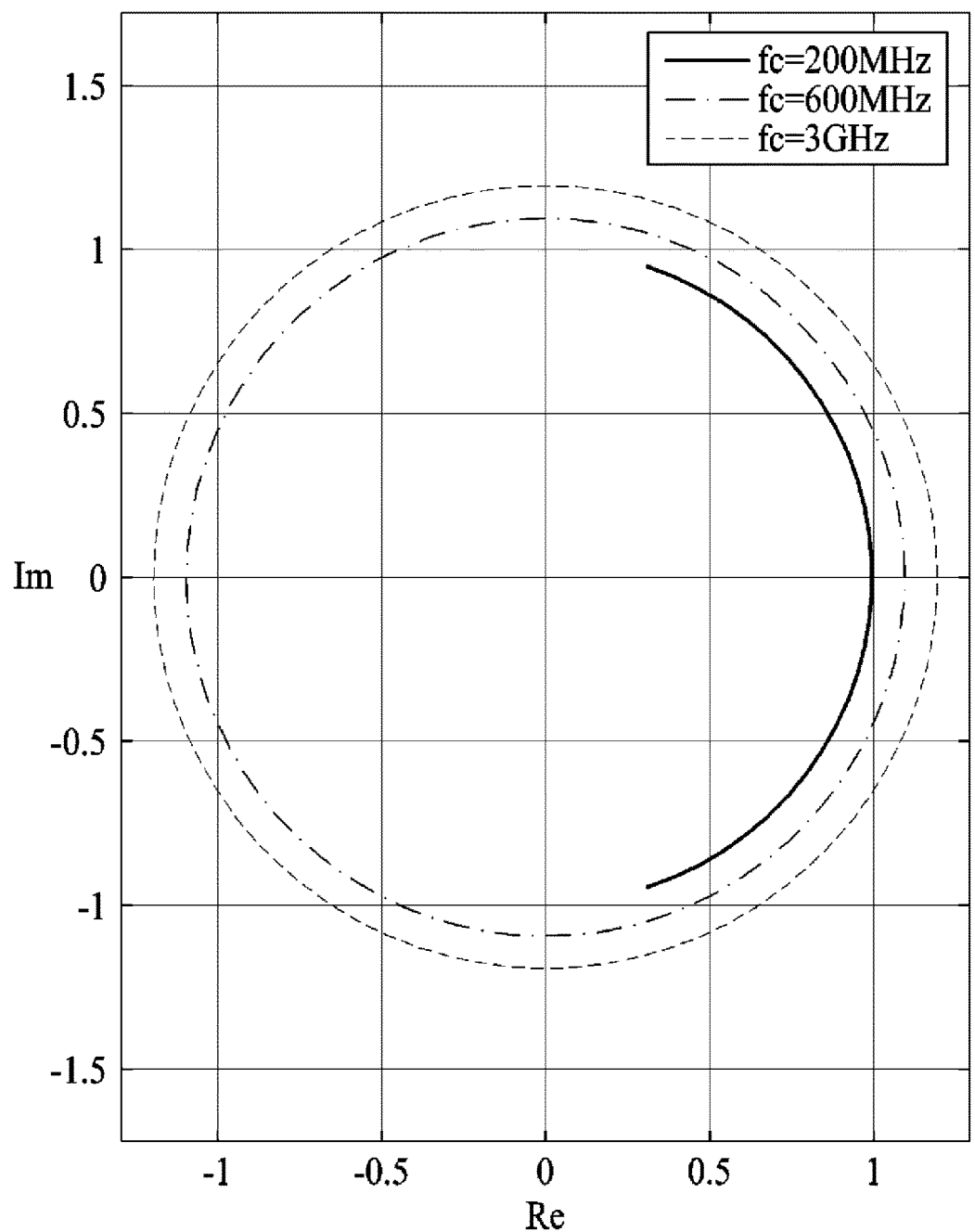
FIG. 9B is a diagram illustrating a performance of an antenna in a circular array.
Figure 10A:
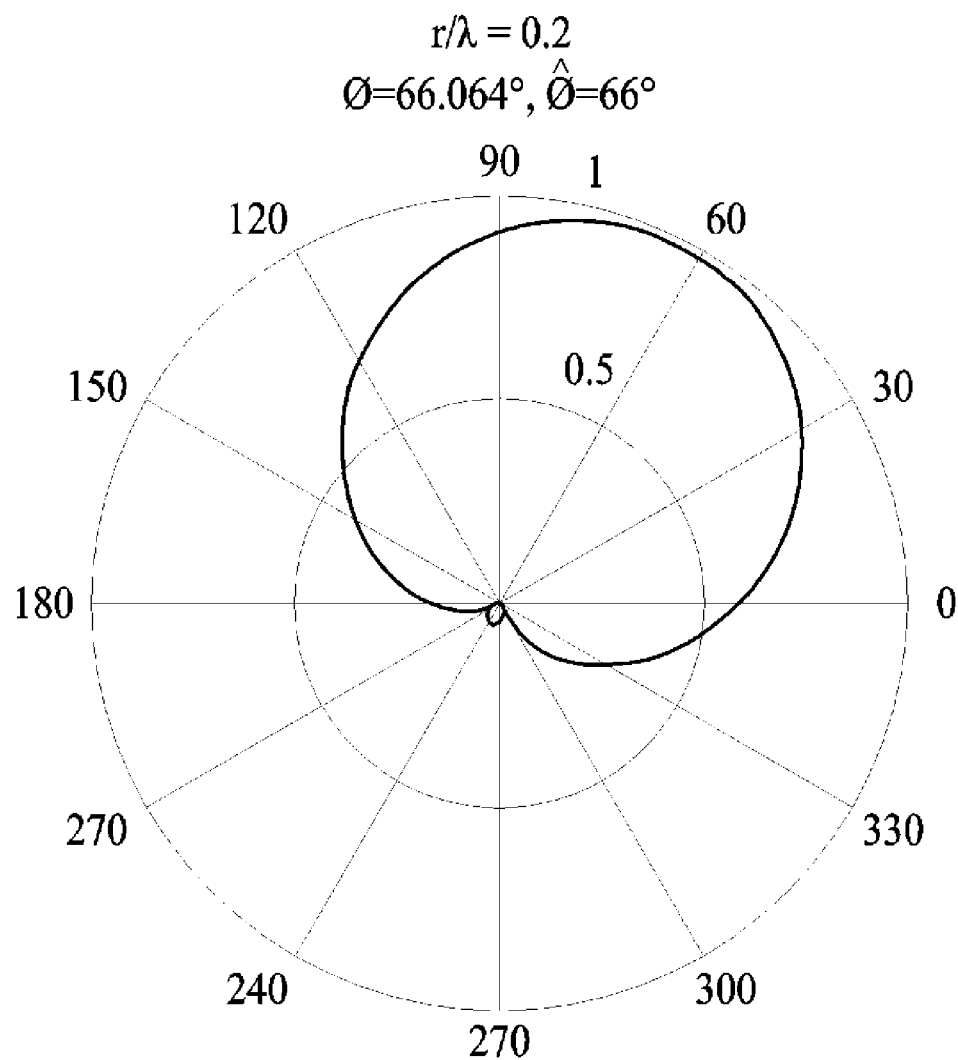
FIG. 10A is a diagram illustrating a performance of an antenna using a circular array in terms of a beam pattern.
Figure 10D:
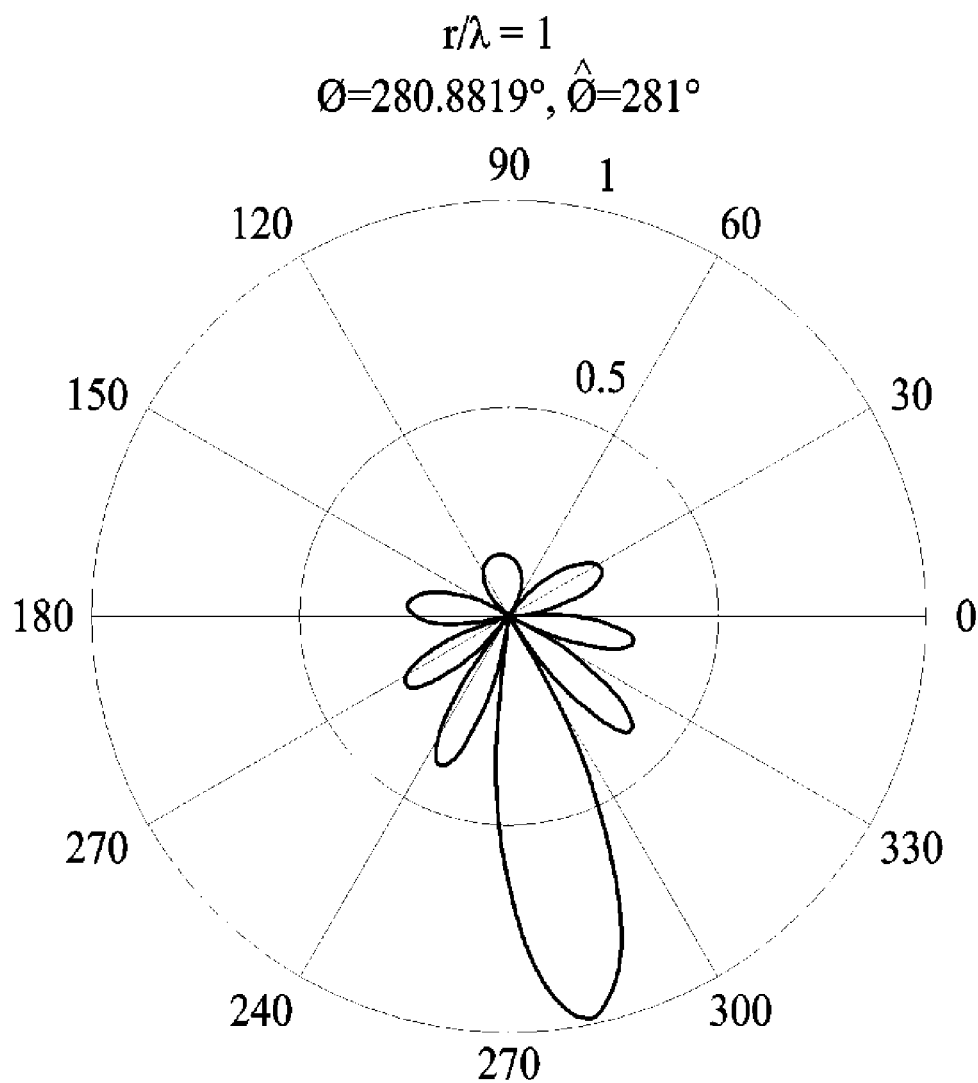
FIG. 10D is a diagram illustrating a performance of an antenna using a circular array in terms of a beam pattern.
Figure 10F:
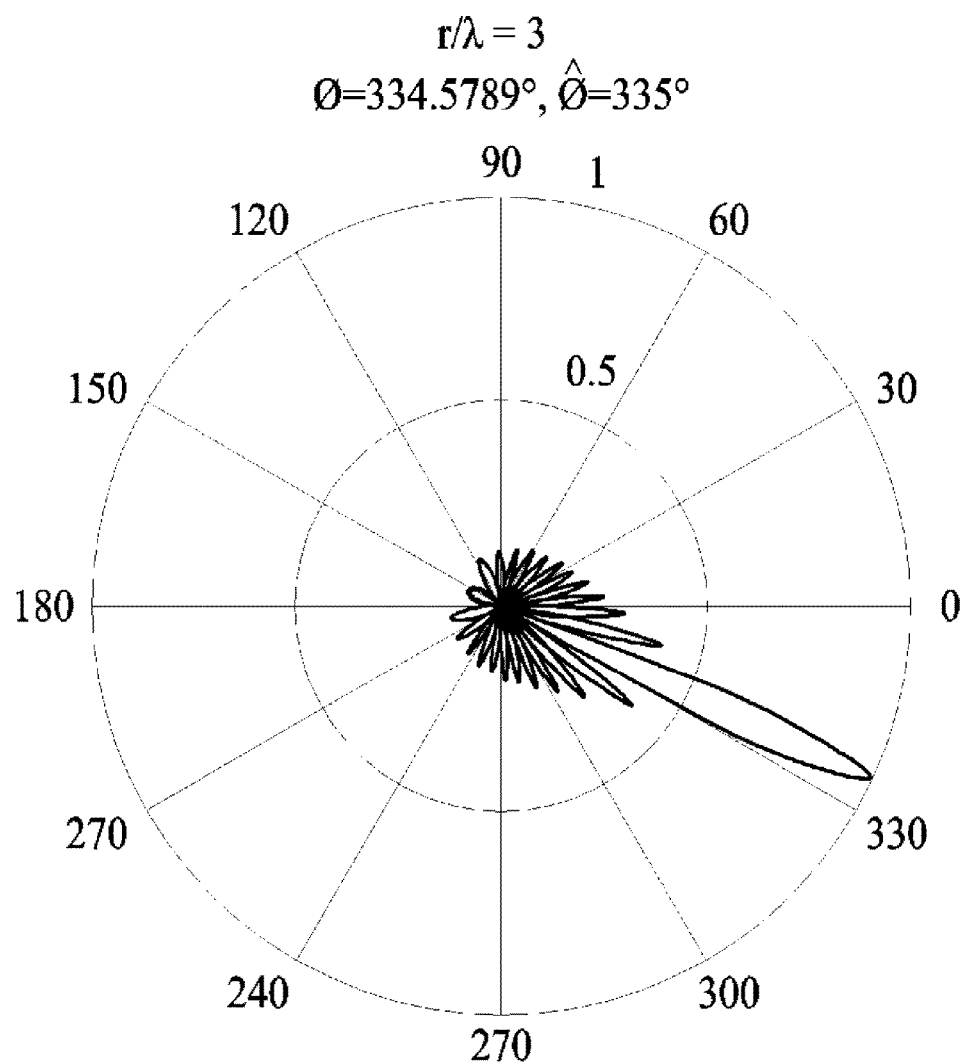
FIG. 10F is a diagram illustrating a performance of an antenna using a circular array in terms of a beam pattern.

FIG. 9A is a diagram illustrating a performance of an antenna in a circular array, FIG. 9B is a diagram illustrating a performance of an antenna in a circular array, and FIGS. 10A through 10F are diagrams illustrating examples of a performance of an antenna using a circular array in terms of a beam pattern.

Referring to FIGS. 9A and 9B, a size of a circular array, for example, a size of an aperture is 30 centimeters (cm), the number of antennas per reference time is 36/1 sec, and a frequency and a wavelength of an interference signal source show a simulation result listed on Table 1 below.

TABLE 1 r = 30 cm

| $f_c$ | $\frac{r}{\lambda_c}$ |
|---|---|
| 200 MHz | 1/5 |
| 300 MHz | 3/10 |
| 600 MHz | 3/5 |
| 1 GHz | 1 |
| 2 GHz | 2 |
| 3 GHz | 3 |

FIGS. 9A and 9B illustrate cases in which a frequency of an interference signal source is 200 megahertz (MHz), 600 MHz, and 3 GHz. As the frequency of the interference signal source increases, an observable phase range of a function F defined in Equation 2 may increase, which may increase a performance associated with detection of a direction.

FIGS. 10A through 10F illustrate examples of an autocorrelation result of the function F defined in Equation 2 using Equation 4 with respect to a simulation result listed on Table 1 in terms of a beam pattern. Specifically, FIGS. 10A through 10F illustrate cases in which $$\frac{r}{\lambda_c}$$

is 0.2, 0.3, 0.6, 1, 2, and 3 in terms of the beam pattern.

$$\check{F}(\varphi) \triangleq F(\varphi) * F(-\varphi)^* \quad \text{[Equation 4]}$$

In Equation 4, $\varphi$ is $$\frac{r}{\lambda_c}$$

and $\check{F}(\varphi)$ denotes an autocorrelation result of the function F defined in Equation 2 using the beam pattern.

When a position of the interference signal source is estimated using Equation 4, a beam resolution may be excellent even in a case in which a plurality of reflected waves is present such as an indoor environment and thus, a main path of an interference signal may be accurately estimated.

FIG. 11 is a flowchart illustrating a position estimation method according to an example embodiment.

Referring to FIG. 11, in operation 1110, the position estimation apparatus may acquire an environment, a frequency, and a bandwidth of the interference signal source. The environment may include an indoor environment and an outdoor environment.

In operation 1120, the position estimation apparatus may determine an arrangement form of antennas based on the environment, the frequency, and the bandwidth of the interference signal source.

The position estimation apparatus may arrange the antennas in a linear array or a hybrid array when the interference signal source is included in the indoor environment. The position estimation apparatus may arrange the antennas in a circular array or a hybrid array when the interference signal source is included in the outdoor environment.

The position estimation apparatus may determine the number of antennas based on a frequency and a bandwidth of an interference signal of the interference signal source. A position of an antenna may indicate a size of an array on which the antenna moves. The number of antennas may indicate a speed of an antenna. When the frequency and the bandwidth of the interference signal source are changed, the position estimation apparatus may change the arrangement form of the antennas.

The position estimation apparatus may correct the position of the antenna and the number of antennas based on the frequency, a presence time, and a periodicity of the interference signal of the interference signal source.

In operation 1130, the position estimation apparatus may estimate a position of the interference signal source based on an interference signal of the interference signal source and the antenna. In this example, the position estimation apparatus may additionally use beacon information acquired from a beacon.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of estimating a position of an interference signal source using two antennas, the method comprising:
    acquiring an environment, a frequency, and a bandwidth of the interference signal source;
    determining an arrangement form of the two antennas based on the environment, the frequency, and the bandwidth and arranging the two antennas; and
    estimating a position of the interference signal source based on an interference signal of the interference signal source and the two arranged antennas,
    wherein the environment includes an indoor environment and an outdoor environment,
    wherein the determining of the arrangement form comprises: determining at least one of a linear array, circular array, and a hybrid array based on the environment, the hybrid array being a combination of the linear array and the circular array,
    wherein the two antennas comprise a first antenna and a second antenna;
    wherein when the environment is the indoor environment the first antenna and the second antenna are determined to be in the linear array or the hybrid array, and
    wherein when the environment is the outdoor environment the first antenna and the second antenna are determined to be in the circular array or the hybrid array.

2. The method of claim 1, wherein the determining of the array comprises: arranging the first antenna to be stationary and the second antenna to be movable.

3. The method of claim 1, wherein the determining of the array comprises: arranging the first antenna and the second antenna to be movable.

4. The method of claim 1, wherein arranging of the two antennas in the linear array comprises: arranging the first antenna to be stationary and the second antenna to be movable.

5. The method of claim 1, wherein the arranging of the two antennas in the circular array comprises: arranging the first antenna to be stationary and the second antenna to be rotatable.

6. The method of claim 5, wherein the arranging of the first antenna to be stationary and the second antenna to be rotatable comprises:
    arranging the first antenna at a center of the circular array.

7. The method of claim 5, wherein the arranging of the first antenna to be stationary and the second antenna to be rotatable comprises:
    arranging the first antenna on a circumference of the circular array.

8. The method of claim 1, wherein the arranging of the two antennas in the circular array comprises: arranging the first antenna and the second antenna to be rotatable.

9. The method of claim 1, wherein the determining of the arrangement form comprises:
    determining a distance between the two antennas based on the frequency and the bandwidth.

10. The method of claim 9, wherein the determining of the distance between the two antennas comprises:
    increasing the distance between the two antennas when the frequency is less than a first reference value.

11. The method of claim 9, wherein the determining of the distance between the two antennas comprises:
    increasing the distance between the two antennas when the bandwidth is greater than a second reference value.

12. The method of claim 1, wherein the estimating of the position of the interference signal source comprises:
    acquiring information on a plurality of channels based on the interference signal;
    calculating a difference in phase between the plurality of channels based on the information; and
    estimating the position based on the difference in phase between the plurality of channels.

13. The method of claim 1, wherein the estimating of the position of the interference signal source comprises:

acquiring beacon information; and estimating the position based on the beacon information and the interference signal.

14. An apparatus for estimating a position of an interference signal source, the apparatus comprising:

two antennas configured to acquire an environment, a frequency, and a bandwidth of the interference signal source; and a controller configured to determine an arrangement form of the two antennas based on the environment, the frequency, and the bandwidth, arrange the two antennas, and estimate a position of the interference signal source based on an interference signal of the interference signal source and the two arranged antennas, wherein the environment includes an indoor environment and an outdoor environment, wherein the controller is configured to determine at least one of a linear array, circular array, and a hybrid array based on the environment, the hybrid array being a combination of the linear array and the circular array, wherein the two antennas comprise a first antenna and a second antenna;

wherein when the environment is the indoor environment the first antenna and the second antenna are determined to be in the linear array or the hybrid array, and wherein when the environment is the outdoor environment the first antenna and the second antenna are determined to be in the circular array or the hybrid array.

15. The apparatus of claim 14, wherein the controller is configured to determine a distance between the two antennas based on the frequency and the bandwidth.

* * * * *